(12) United States Patent
Jain et al.

(10) Patent No.: US 10,740,103 B2
(45) Date of Patent: Aug. 11, 2020

(54) PROBABILISTIC TECHNIQUES FOR FORMATTING DIGITAL COMPONENTS

(71) Applicant: Google LLC, Mountain View, CA (US)

(72) Inventors: Ankur Jain, Redwood City, CA (US); Omkar Muralidharan, Sunnyvale, CA (US); Pavel Morar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/254,160

(22) Filed: Jan. 22, 2019

(65) Prior Publication Data

US 2020/0133670 A1    Apr. 30, 2020

Related U.S. Application Data

(60) Provisional application No. 62/751,106, filed on Oct. 26, 2018.

(51) Int. Cl.
*G06F 17/10* (2006.01)
*G06F 9/30* (2018.01)
(Continued)

(52) U.S. Cl.
CPC ............ *G06F 9/30181* (2013.01); *G06F 9/38* (2013.01); *G06F 17/18* (2013.01); *G06N 7/005* (2013.01)

(58) Field of Classification Search
CPC ...... G06F 9/44526; G06F 8/71; G06F 40/103; G06F 40/123; G06F 40/194;
(Continued)

(56) References Cited

U.S. PATENT DOCUMENTS 10,397,056 B2 * 8/2019 Zhong ................... G06F 16/838
10,523,605 B2 * 12/2019 Li ............................ H04L 51/066
(Continued)

FOREIGN PATENT DOCUMENTS

| JP | 2015-509221 | 3/2015 |
| KR | 10-2011-0034174 | 4/2011 |
| KR | 10-2017-0017397 | 2/2017 |

OTHER PUBLICATIONS

PCT International Search Report and Written Opinion in International Appln. No. PCT/US2019/050175, dated Dec. 26, 2019, 9 pages.

*Primary Examiner* — Ariel Mercado
(74) *Attorney, Agent, or Firm* — Fish & Richardson P.C.

(57) ABSTRACT

Methods, systems, and apparatus, including an apparatus for using probabilistic techniques to provide reformatted versions of digital components. In one aspect, a process includes obtaining data specifying a distribution parameter limit for a given reformattable digital component that is eligible for reformatting using a set of digital component extensions. For each of multiple digital component requests, a determination is made that a given digital component extension has an additional selection requirement that, when combined with a base selection requirement for the given reformattable digital component, would exceed the distribution parameter limit. A determination is made, using a probabilistic technique, a probability at which the given digital component extension will be selected for use in generating a reformatted version of the given reformattable digital component such that an aggregate selection requirement for distributing the given reformattable digital component in response to requests over time is within the distribution parameter limit.

20 Claims, 4 Drawing Sheets

(51) Int. Cl.
*G06F 9/38* (2018.01)
*G06F 17/18* (2006.01)
*G06N 7/00* (2006.01)

(58) Field of Classification Search
CPC ............. G06F 16/1794; G06F 16/2365; G06F 16/2448; G06F 16/24547
See application file for complete search history.

(56) References Cited

U.S. PATENT DOCUMENTS

| | | | |
|---|---|---|---|
| 2007/0050204 A1 | 3/2007 | Ranka et al. | |
| 2007/0255759 A1* | 11/2007 | Akelbein | G06F 16/122 |
| 2014/0282692 A1 | 9/2014 | Bhat | |
| 2014/0359431 A1* | 12/2014 | Tummalapenta | G06F 40/103 715/249 |
| 2016/0234526 A1* | 8/2016 | Wang | H04N 21/8451 |

\* cited by examiner

PROBABILISTIC TECHNIQUES FOR FORMATTING DIGITAL COMPONENTS

CROSS-REFERENCE TO RELATED APPLICATIONS

This application claims the benefit under 35 U.S.C. § 119(e) of U.S. Patent Application No. 62/751,106, entitled "PROBABILISTIC TECHNIQUES FOR FORMATTING DIGITAL COMPONENTS," filed Oct. 26, 2018. The disclosure of the foregoing application is incorporated herein by reference in its entirety for all purposes.

BACKGROUND

The Internet provides access to a wide variety of resources. For example, video and/or audio files, as well as web pages for particular subjects or particular news articles are accessible over the Internet. The resources can present content related to the particular subjects or particular news articles. Digital components can be presented with the content of the resources. Some digital components can be reformatted, e.g., by adding extensions to the digital components. However, some digital components may not be eligible to be reformatted using some extensions.

SUMMARY

This specification describes technologies relating to using probabilistic techniques to reformat digital components such that particular formats of the digital component that would not otherwise be provided are provided a portion of the times that the digital component is provided for presentation.

In general, one innovative aspect of the subject matter described in this specification can be embodied in systems that include one or more front-end servers configured to receive requests for digital components and provide digital components in response to the requests and one or more back-end servers in data communication with the one or more front-end servers. The one or more back-end servers can be configured to perform operations that include obtaining data specifying a distribution parameter limit for a given reformattable digital component that is eligible for reformatting using a set of digital component extensions. Each digital component extension can include additional content that, when selected, is used to generate a reformatted version of the given reformattable digital component. For each of multiple digital component requests for which the given reformattable digital component is selected for distribution to a client device in response to the digital component request, the back-end server(s) can determine that a given digital component extension in the set of the digital component extensions has an additional selection requirement that, when combined with a base selection requirement for the given reformattable digital component, would exceed the distribution parameter limit for the given reformattable digital component. The base selection requirement is an amount required to be submitted to digital component distributor to provide a base version of the digital component without an extension. The back-end server(s) can determine, using a probabilistic technique and based at least on the distribution parameter limit and the base selection requirement, a probability at which the given digital component extension will be selected for use in generating a reformatted version of the given reformattable digital component such that an aggregate selection requirement for distributing the given reformattable digital component in response to a plurality of requests over time is within the distribution parameter limit. The back-end server(s) can select a digital component extension for the given reformattable digital component. The given digital component extension for which a combination of the base selection requirement and the additional selection requirement exceeds the distribution parameter limit is selected for a portion of the digital component requests according to the determined probability. The back-end server(s) can generate a reformatted version of the given reformattable digital component using the selected digital component extension. The back-end server(s) can provide the reformatted version of the given reformattable digital component to the front-end server(s). The front-end server(s) can transmit the reformatted version of the given digital component to the client device for which the digital component request was received. Other implementations of this aspect include corresponding apparatus, methods, and computer programs, configured to perform the aspects of the methods, encoded on computer storage devices.

These and other implementations can each optionally include one or more of the following features. In some aspects, the operations include determining, using the probabilistic technique, a second probability at which a second digital component extension will be selected for use in generating a second reformatted version of the given reformattable digital component. A combination of the base selection requirement and a second additional selection requirement for the second digital component extensions can be less than the distribution parameter limit.

In some aspects, the operations include selecting the given digital component extension and the second digital component extension from the set of digital component extensions based on (i) the combination of the base selection requirement and the additional selection requirement and (ii) the combination of the base selection requirement and the second additional selection requirement. Selecting the given digital component extension and the second digital component extension from the set of digital component extensions can include determining that a first combined selection requirement that is based on the combination of the base selection requirement and the additional selection requirement is a lowest combined selection requirement for the set of digital component extensions that is higher than the distribution parameter limit and, in response, selecting the given digital component extension and determining that a second combined selection requirement that is based on the combination of the base selection requirement and a second additional selection requirement is a highest combined selection requirement for the set of digital component extensions that is less than the distribution parameter limit and, in response, selecting the second digital component extension.

In some aspects, the operations include determining, using the probabilistic technique, a second probability at which the given reformattable digital component will be provided without reformatting using a digital component extension.

In some aspects, the operations include determining, for each or two or more second digital component extensions, a respective second probability at which the second digital component extension will be selected for use in generating a second reformatted version of the given reformattable digital component. The probability at which the given digital component extension will be selected and each second probability can be determined such that the aggregate selection requirement for distributing the given reformattable digital component using the given digital component extension and each of the second digital component extensions is within the distribution parameter limit.

Determining the probability at which the given digital component will be selected for use in generating the reformatted version of the given reformattable digital component can include determining the probability based on an expected increase in user interactions with the reformattable digital component by including the given digital component extension in the reformatted version of the reformattable digital component.

In some aspects, the base selection requirement for the given reformattable digital component is based on a combination of the distribution parameter limit and a performance of the reformattable digital component.

The subject matter described in this specification can be implemented in particular embodiments so as to realize one or more of the following advantages. Using probabilistic techniques described herein, formats of digital components that would otherwise not be provided based on their associated selection requirements are provided at a specified rate such that a distribution parameter limit for the digital component is not exceeded. Selecting extensions for use in reformatting digital components using specified probabilities allows digital components to be reformatted using multiple extensions such that the aggregate selection requirements for distributed formats of the digital components is equal to or close to (e.g., within a threshold of) the distribution parameter limit for the digital component.

Using the unconventional digital component distribution techniques described herein, the user experience is improved relative to conventional techniques as users are provided digital components in formats that have higher user interaction rates and are thus preferred by users. In addition, users are provided more interactive digital components that initiate actions for the users as conventionally these formats of digital components often have selection requirements that exceed distribution parameter limits for the digital components. Digital component distributors are benefitted by higher interaction rates due to the digital components being provided in formats that have higher user interaction rates.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
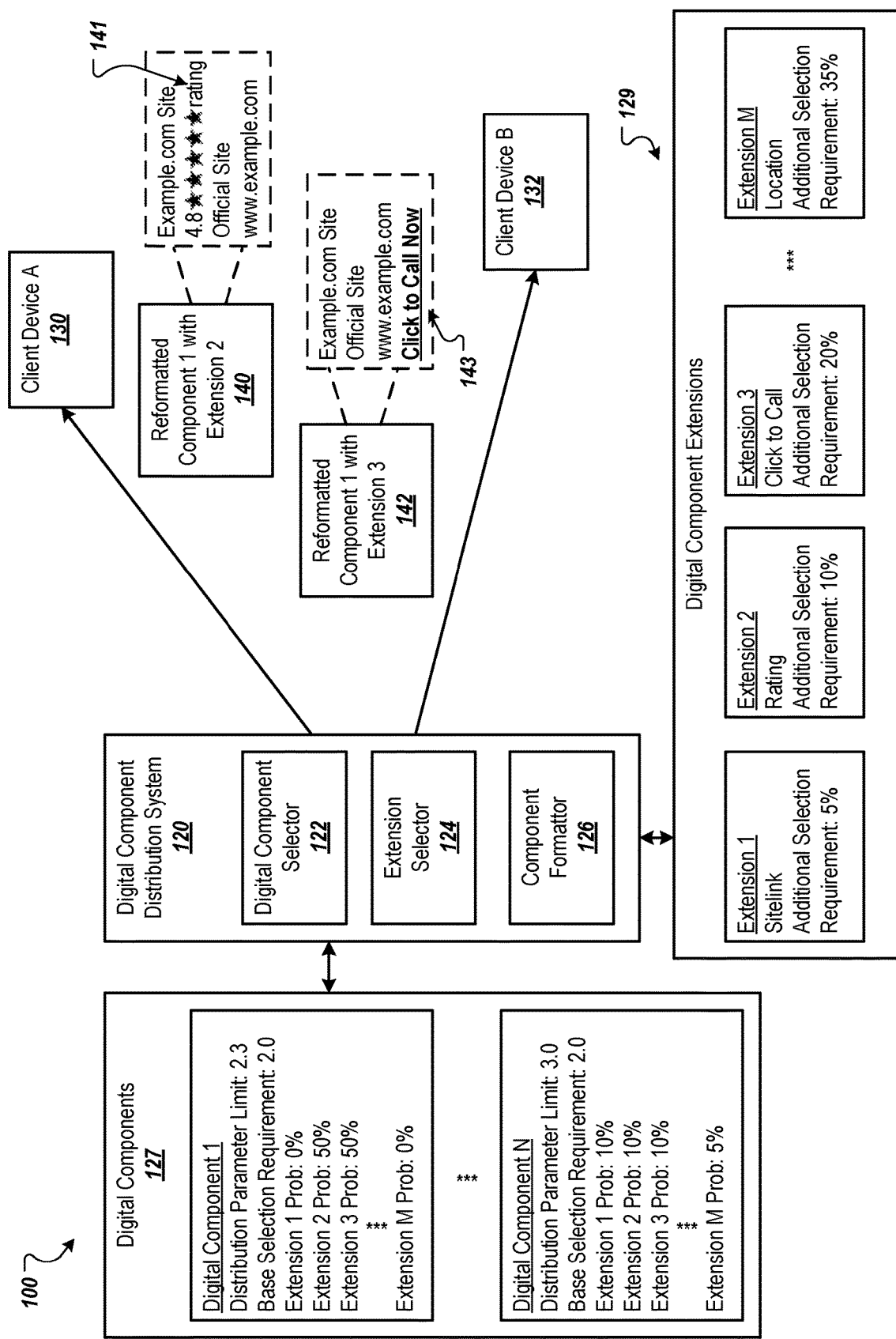
FIG. 1 is a block diagram of an environment in which an example digital component distribution system generates and distributes reformatted versions of digital components.

In general, systems and techniques described herein can generate and distribute reformatted versions of digital components such that reformatted versions that normally would not be eligible for distribution based on a distribution parameter limit are distributed without exceeding a distribution parameter limit. For the purposes of this document, a reformattable digital component is a digital component that can be formatted using different content and/or different functionality, e.g., using different digital component extensions. A digital component extension is additional content or functionality that can be added to a digital component to generate a reformatted version of the digital component. For brevity, digital component extensions are also referred to as extensions. It is an object of the described technologies to enable digital components to be reformatted with extensions that would cause the resulting combined selection requirement to exceed the distribution parameter limit.

Digital components can be selected for distribution based on distribution parameter limits for the digital components. In general, the distribution parameter limit is a maximum amount that a digital component publisher of the digital component is willing to provide for presentation of the digital component. For example, the distribution parameter limit for a digital component can be a maximum bid for some selection processes. The amount required to be submitted for each presentation of the base version of the digital component (i.e., a base selection requirement) is often less than the distribution parameter limit as a result of the selection process. For example, the base selection requirement for a selected digital component can be the distribution parameter limit for a digital component having the second highest distribution parameter limit. In such cases, the digital component distributor can add one or more extensions to the digital component as long as a combined selection requirement that is based on the base selection requirement and an additional selection requirement for each of the one or more extensions is not exceeded.

Each extension can have an associated additional selection requirement that can be added to the base selection requirement when the digital component is reformatted to include the extension. For example, if the digital component distribution system reformats a digital component using a given extension, the publisher of the digital component can be required to submit a combined selection requirement that is equal to, or based on, a sum of the base selection requirement and the additional selection requirement.

Digital component publishers can specify the distribution parameter limit that the combined selection requirement is not to exceed and enable the digital component distributor to add extensions to the digital component as long as the distribution parameter limit is not exceeded. This provides the digital component distribution system flexibility in providing the digital component in various formats. However, the distribution parameter limit can also prevent the digital component from being presented with extensions that would cause the combined selection requirement to exceed the distribution parameter limit. The techniques described in this document enable digital components to be reformatted with some extensions that would cause the combined selection requirement to exceed the distribution parameter limit, while ensuring that, over time, an aggregate (e.g., average) combined selection requirement for the digital component is equal to or less than the distribution parameter limit.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

FIG. 1 is a block diagram of an environment 100 in which an example digital component distribution system 120 generates and distributes reformatted versions of digital components. The digital component distribution system 120 includes a digital component selector 122, an extension selector 124, and a digital component formatter 126. As described below with reference to FIG. 2, each of these components can be implemented in one or more servers.

The digital component selector 122 can select one or more digital components to provide in response to a digital component request received from a client device, e.g., client device A 130 or client device B 132. The digital component selector 122 can select the digital component(s) from a set of digital components 127 based on a distribution parameter limit for each digital component, the quality or performance of the digital component, and/or other distribution criteria for each digital component 127. As described in more detail below, the distribution parameter limit is an amount, e.g., in currency, that a selection requirement for providing the digital component is not to exceed. An aggregate distribution parameter limit can be an amount, e.g., an average amount that aggregate selection requirements, e.g., average selection requirements, for multiple distributions of the digital component are not to exceed. For example, the average selection requirement across the multiple distributions may not exceed the aggregate distribution parameter limit, which in this example may equal the distribution parameter limit. In a particular example, if the distribution parameter limit is 10, the average selection requirement for the multiple distributions of the digital component should not exceed 10.

The digital component extension selector 124 can determine selection probabilities for digital components and use the selection probabilities to select extensions for digital components. A selection probability for an extension defines a probability at which the digital component extension selector 124 selects the extension for use in reformatting the digital component. For example, if the selection probability for a given extension is 10%, the given extension has a 10% of being selected for use in reformatting the digital component for a given presentation of the digital component. The extension selector 124 can select the extension from a set of digital component extensions 129. Each extension can include additional content or functionality that can be used to reformat a digital component, e.g., by adding the extension to the digital component or replacing part of the digital component with the extension.

For example, the extension 1 adds a site link to a website associated with the digital component and has an associated additional selection requirement of 5% of the base selection requirement for the digital component. The extension 2 is a rating for an entity associated with the digital component and has an associated additional selection requirement of 10% of the base selection requirement for the digital component. The extension 3 is a click to call link that, when interacted with, causes a phone displaying the digital component to call a phone number of the entity associated with the digital component and has an associated additional selection requirement of 20% of the base selection requirement for the digital component. The extension 4 is a location of the entity to the digital component and has an associated additional selection requirement of 35% of the base selection requirement for the digital component. In some implementations, the additional selection requirements for extensions can be different for different for different digital components.

The selection probabilities for the extensions are defined such that extensions for which the combined selection requirement, e.g., the base selection requirement plus the additional selection requirement for the extension, exceeds the distribution parameter limit can still be provided. For example, by providing the digital component in formats that have combined selection requirements that is less than the distribution parameter limit and providing the digital component in formats that have combined selection requirements that exceed the distribution parameter limit at specified selection probabilities, the aggregate selection requirements can be less than or equal to the distribution parameter limit. Example techniques for determining the selection probabilities are described below.

As an example, for a given selection process in which the digital component a is selected for presentation at a client device, the digital component 1 has a distribution parameter limit of 2.3, a base selection requirement of 2.0, a selection probability for extension 2 of 50% and a selection probability for extension 3 of 50%. In this example, the combined selection requirement for extension 2 is 2.0+(2.0*0.1)=2.2 as the additional selection requirement for extension 2 is 0.1 (e.g., 5% of the base selection requirement). Similarly, the combined selection requirement for extension 3 is 2.0+(2.0*0.2)=2.4 as the additional selection requirement for extension 3 is 0.2 (e.g., 10% of the base selection requirement).

In this example, the combined selection requirement of digital component 1 with extension 3 (2.4) exceeds the distribution parameter (2.3). Thus, the extension 3 may not be used with digital component 1 unless one of the parameters changed. However, if extension 3 is used 50% of the time and extension 2 was used 50% of the time in which the base selection requirement is 2.0, the aggregate selection requirement, e.g., average selection requirement, for digital component 1 would be 2.3 for the presentations of the digital component 1 for which the base selection requirement is 2.0. For example, if extension 3 is used 10 times and extension 2 is used 10 times, the total amount would be 24 (i.e., 2.4·10) plus 23 (i.e., 2.2·10)=46. The average for the 20 times would be 2.3 (e.g., 46/20), which equals the distribution parameter limit for the digital component 1. By distributing the digital component using zero or more extensions that have a combined selection requirement that is less than the distribution parameter limit along with distributing the digital component using one or more extensions that have a combined selection requirement that is greater than the distribution limit at specified probabilities, the extensions with higher additional selection requirements can be used without exceeding the aggregate distribution parameter limit over time.

The digital component extension selector 124 can select the extension for a digital component using the probabilities and send data specifying the digital component and the extension to the digital component formatter 126. The digital component formatter 126 can generate a reformatted version of the digital component using the selected extension. For example, the digital component formatter 126 can add the data or functionality defined by the selected extension to the digital component.

The digital component distribution system 120 can then transmit the reformatted digital component to the client device from which the digital component request was received. In the illustrated example, the digital component distribution system 120 has generated a reformatted version 140 of digital component 1 with extension 2 and transmitted the reformatted version 140 to client device A 130. The reformatted version 140 includes a rating 141 as specified by extension 2. Similarly, the digital component distribution system 120 has generated a reformatted version 142 of digital component 1 with extension 3 and transmitted the reformatted version 142 to client device B 132. The reformatted version 142 includes click to call link 143 as specified by extension 3.

By using selection probabilities, the digital component distribution system 120 can select extensions in real time or near real time after selecting a digital component to provide in response to a digital component requests. As the digital component distribution system 120 can receive millions of digital component requests each day and has to respond to each request with one or more digital components within short periods of time, e.g., in milliseconds, a deterministic technique for selecting extensions fast, such as the techniques described herein, is required.

Figure 2:
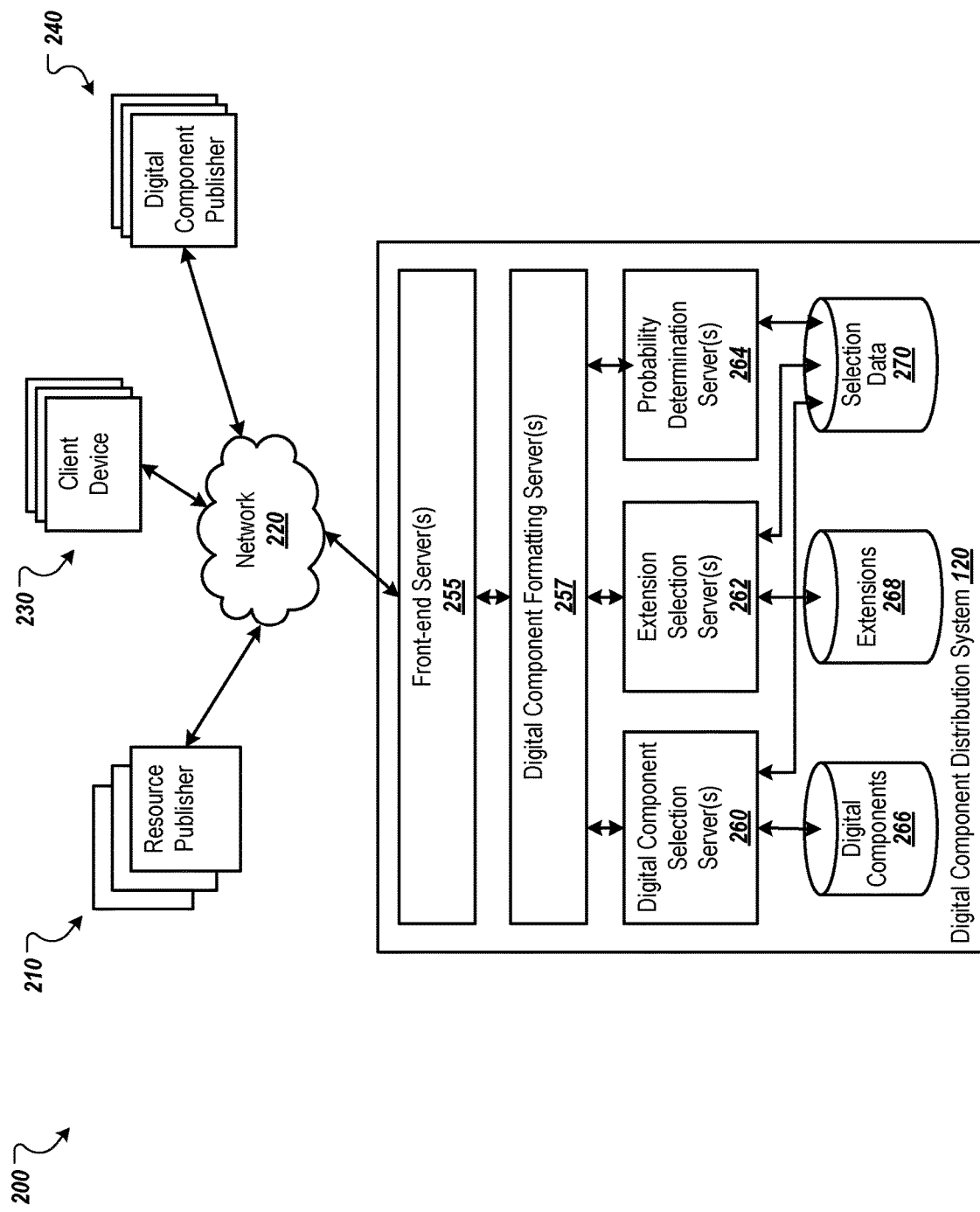
FIG. 2 is a block diagram of an environment in which the example digital component distribution system of FIG. 1 generates and distributes reformatted versions of digital components.

Elements of the digital component distribution system 120 are described in more detail with respect to FIG. 2, which is a block diagram of an environment 200 in which the example digital component distribution system 120 generates and distributes reformatted versions of digital components.

The digital component distribution system 120 includes one or more front-end servers 255 that receive digital component requests from client devices 230 and provide, in response to the requests, digital components to the client devices 230. The front-end server 255 can receive the requests and transmit the digital components over a data communication network 220, e.g., a local area network (LAN), a wide area network (WAN), the Internet, a mobile network, or a combination thereof. The network 120 connects the digital component distribution system 120, resource publishers 210 (e.g., publishers of web pages and/or applications), client devices 230, and digital component publishers 240.

The digital component distribution system 120 includes back-end servers that select digital components and reformat the digital components to provide in response to digital component requests. The back-end servers include one or more digital component selection servers 260, one or more extension selection servers 262, one or more selection probability determination servers 264, and one or more digital component formatting servers 257.

The digital component selection server 260 selects one or more digital components to provide in response to a digital component request. The digital component selection server 260 can select the one or more digital components from digital components stored in a digital component data storage device 266, e.g., one or more hard drives, flash memory, and/or other appropriate type of storage device. The digital components stored in the digital components data storage device 266 can include digital components provided by digital component publishers 240, e.g., entities that provide digital components for distribution to users. The digital components can include content, e.g., text, images, etc., related to the digital component publisher 240 and/or a product or service provided by the digital component publisher 240.

The digital component selection server 260 can select the one or more digital components based on distribution parameter limits for the digital components, distribution criteria for the digital components, quality of the digital components, and/or performance of the digital components.

For example, a digital component can have associated distribution criteria that specifies the context, e.g., particular web pages, particular search keywords, resources that include particular keywords or directed to particular topics, etc., in which the digital component is eligible for distribution. In this example, the digital component selection server 260 can select from digital components that are eligible for presentation in a context defined by the digital component request, e.g., using the distribution parameter limits, quality, and/or performance.

The distribution parameter limit is an amount, e.g., in currency, that a selection requirement for providing the digital component is not to exceed. For example, as described above, the actual selection requirement for a particular distribution of a digital component can be a combined election requirement based on a combination of the base selection requirement and an additional selection requirement for an extension used to reformat the digital component.

A digital component can have multiple distribution parameter limits. For example, the digital component publisher 240 can specify different distribution parameter limits for different presentation contexts. In addition, the performance or quality of the digital component can vary based on the presentation context in which the digital component is presented. For example, a digital component related to baseball bats may perform better, e.g., receive user interactions at a higher rate, when presented on web pages related to baseball than when presented on web pages related to cars. If the base selection requirement is based on performance or quality in combination with the distribution parameter limit, this difference in performance or quality for different presentation contexts can affect the base selection requirement for the digital component for the different presentation contexts.

As described above, the digital component server 260 can identify digital components that are eligible for distribution in response to a request, e.g., based on the presentation context. The digital component server 260 can then select one or more digital components from the eligible digital components based on their distribution parameter limits, e.g., the distribution parameter limits for the presentation context.

The digital component server 260 can use one or more types of selection processes and the distribution parameter limits and base selection requirements for digital components can vary based on the selection process. In one example, the digital component publishers provide distribution parameter limits for each impression (e.g., each presentation) of the digital component. In this example, the distribution parameter limit can be a cost-per-impression bid and the digital component selection server 260 can select the digital component having the highest distribution parameter limit for the presentation context. The base selection requirement for the selected digital component can be equal to the distribution parameter limit for the selected digital component, the distribution parameter limit for the digital component having the second highest distribution parameter limit (e.g., the second highest bid), or the second highest bid plus another amount (e.g., one cent).

In another example, the digital component publishers 240 can provide distribution parameter limits for each user action, e.g., a selection of the digital component or another action after selection of the digital component. For example, the distribution parameter limits can be cost per click ("CPC") bids or cost per conversion bids. In this example, the base selection requirement for the selected digital component can be equal to the distribution parameter limit for the selected digital component, the distribution parameter limit for the digital component having the second highest distribution parameter limit (e.g., the second highest bid), or the second highest bid plus another amount (e.g., one cent).

In another example, the digital component selection server 260 can select digital components based on the effective cost of a particular number of presentations of the digital components. For example, the digital component selection server 260 can determine an effective cost for a million presentations of a digital component based on a product the CPC bid for the digital component and the performance (e.g., click-through rate) of the digital component. In this example, the distribution parameter limit for each digital component can be an eCPM bid for the digital component. The base selection requirement for the selected digital component can be equal to the distribution parameter limit for the selected digital component, the distribution parameter limit for the digital component having the second highest distribution parameter limit (e.g., the second highest bid), or the second highest bid plus another amount (e.g., one cent).

The digital component selection server 260 can provide the selected digital component or data identifying the selected digital component to the extension selection server 262. The extension selection server 262 can determine whether the selected digital component is to be reformatted using an extension and, if so, select an extension for the digital component. As described above, an extension is additional content or functionality that can be added to a digital component to generate a reformatted version of the digital component. The extensions or data used to generate the extensions, e.g., links, phone numbers, reviews, etc., can be stored in an extensions data storage device 268, e.g., one or more hard drives, flash memory, etc.

The extension selection server 262 can select an extension for a digital component based on selection probabilities for each extension for the digital component. The selection probability for an extension defines a probability, or other rate, at which the extension selection server 262 selects the extension for use in reformatting the digital component. The option for not using an extension can also have a selection probability for the digital component which defines a rate at which the digital component is distributed without an extension.

For example, a given digital component can have a selection probability of 25% for no extension, a selection probability of 25% for extension 1, a selection probability of 25% for extension 2, and a selection probability of 25% for extension 4. In this example, there is a 25% chance that the digital component will be provided with no extension, a 25% chance that the digital component will be provided with extension 1, a 25% chance that the digital component will be provided with extension 2, and a 25% chance that the digital component will be provided extension 3.

As described below, the probability determination server 264 can determine the selection probabilities for the extensions using the base selection requirement for the digital component. As the base selection requirement can differ based on the results of the selection process for which the digital component was selected (e.g., using the second highest bid), the probability determination server 264 can determine the selection probabilities after the digital component has been selected. In another example, the probability determination server 264 can determine selection probabilities prior to the selection process, e.g., for multiple potential base selection requirements. In this example, the selection probabilities can be stored in a selection data storage unit 270 and can be accessed after the digital component has been selected.

The extension selection server 262 can provide the selected digital component and the selected extension (or data specifying the selected digital component and the selected extension) to the digital component formatting server 257. The digital component formatting server 257 can reformat the digital component using the selected extension. For example, the digital component formatting server 257 can add the context or functionality of the selected extension to the selected digital component. In a particular example, if the selected extension is a link to a web page, the digital component formatting server 257 can add the link to the digital component. If the selected extension is a click to call extension, the digital component formatting server 257 can add a click to call link to the digital component with a reference to the phone number for the digital component.

The digital component formatting server 257 can provide the reformatted version of the digital component to the front-end server 255. In turn, the front-end server 255 can provide the reformatted version of the digital component to the client device 230 from which the digital component request was received.

The probability determination server 264 can determine the selection probabilities for the digital components and the extensions. Each extension can have a corresponding additional selection requirement. The additional selection requirement for an extension is an amount required to be submitted to the digital component distributor for use of the extension in reformatting a digital component using the extension. If the digital component formatting server 257 reformats a given digital component using a given extension, the digital component publisher of the given digital component would be required to submit a combined selection requirement that is an amount based on the base selection requirement for the given digital component and the additional selection requirement for the given extension. For example, the combined selection requirement can be equal to a sum of the base selection requirement and the additional selection requirement.

The additional selection requirement for an extension can be expressed as a percentage of the base selection requirement. For example, an extension can have an additional selection requirement that is 10% of the base selection for any digital component with which the extension is used. In this example, if the base selection requirement for a digital component is 10, the additional selection requirement would be 1 and the combined selection requirement would be 11.

In some implementations, the additional selection requirement for an extension is based on an increase in the user interaction rates for digital components when the digital components are reformatted using the extension relative to the user interaction rate of the digital component when no extensions are used. For example, a given extension can result in a 10% increase in the user interaction rate across all digital components with which the extension has been used. This increase is also referred to as the lift of the extension.

The percentage of the base selection requirement specified by an additional selection requirement for an extension can be equal to or proportional to the lift of the extension. For example, the percentage can be half of the lift. In this example, if an extension provides a 10% lift, the additional selection requirement can be 5% of the base selection requirement for a digital component with which the extension is used.

In some implementations, the additional selections requirements for an extension can be different for different digital components. For example, the additional selection requirement for a given extension may be 10% of the base selection requirement for a first digital component. The additional selection requirement for the given extension may be 20% of the base selection requirement for a second digital component different from the first digital component.

The probability determination server 264 can determine the selection probabilities for a digital component using the base selection requirement for the digital component and the additional selection requirements for the extensions. The probability determination server 264 can determine the selection probabilities such that extensions for which the combined selection requirement would exceed the distribution parameter limit are used to reformat the digital component but that, over time, the distribution limit for the digital component is not exceeded. For example, if the distribution parameter limit for a digital component in a particular presentation context is 10, the probability determination server 264 can determine the selection probabilities such that the average combined selection requirement for the digital component in the particular presentation context does not exceed 10 although some of the presentations of the digital component in the particular presentation context use an extension for which the combined selection requirement exceeds 10.

Absent the probabilistic techniques described herein, a digital component would not be reformatted using extensions for which the combined selection requirement would exceed the distribution parameter limit for the digital component. As an example, a first extension can provide a 10% lift for a digital component, but has an additional selection requirement that increases the base selection requirement by 5%. A second extension can provide a 20% lift, but has an additional selection requirement that increases the base selection requirement by 15%. In this example, if the distribution parameter limit is such that only 15% lift can be obtained without exceeding the distribution parameter limit, only the first extension would be used without the probabilistic techniques resulting in only 10% lift. Using the probabilistic techniques, both extensions can be used at specified probabilities such that 15% lift is achieved without exceeding the distribution parameter limit.

For each time a digital component is selected for presentation, the probability determination server 264 can select one or more extensions and determine the selection probabilities for the one or more extensions such that an average combined selection requirement, accounting for the selection probabilities, for the digital component using one or more extensions is equal to or within a threshold amount of the distribution parameter limit for the digital component. In a particular example, the probability determination server 264 identifies two formats of the digital component. The two formats can include a format with no extension and a format with an extension, or two formats with extensions. The probability determination server 264 can select, as the two formats, the format with the highest combined selection requirement without exceeding the distribution parameter limit and the format with the lowest combined selection requirement that does exceed the distribution parameter limit.

In a particular example, consider the distribution parameter limit to be 2.3, the base selection requirement to be 2.0, the combined selection requirement for extension 1 to be 2.1 (e.g., an additional selection requirement that is 5% of the base selection requirement), the combined selection requirement for extension 2 to be 2.2 (e.g., an additional selection requirement that is 10% of the base selection requirement), the combined selection requirement for extension 3 to be 2.4 (e.g., an additional selection requirement that is 20% of the base selection requirement), and the combined selection requirement for extension 4 to be 2.6 (e.g., an additional selection requirement that is 30% of the base selection requirement). In this example, the probability distribution server 264 would select, as the two formats, the format with extension 2 as it is the format with the highest combined selection requirement (2.2) without exceeding the distribution parameter limit (2.3) and the format with extension 3 as it is the format with the lowest combined selection requirement (2.4) that does exceed the distribution parameter limit (2.3).

The probability determination server 264 can then determine the probabilities for the two formats such that the average selection requirement is equal to or within a threshold amount (e.g., 1%, 5%, or another appropriate amount) of the distribution parameter limit. In this example, the probability determination server 264 can use Relationship 1 below to determine the selection probabilities. Relationship 1 defines the relationship between the base selection requirements, the additional selection requirements, the selection probabilities, and the distribution parameter limit for two formats of the digital component.

$$\text{Base } SR*((p_1*(1+ASR_1)+((1-p_1)*(1+ASR_2)))=DPL \quad \text{Relationship 1:}$$

In relationship 1, Base SR is the base selection requirement for the digital component, $p_1$ is the selection probability for the first format (e.g., with no extension or the extension with the highest combined selection requirement that does not exceed the distribution parameter limit), $ASR_1$ is the additional selection requirement for the first format, $ASR_2$ is the additional selection requirement for the second format (e.g., with the extension with the lowest combined selection requirement that does exceed the distribution parameter limit), and DPL is the distribution parameter limit for the digital component. In Relationship 1, the additional selection requirements are expressed as the percentage of the base selection requirement (e.g., 10% of the base selection requirement). The probability determination server 264 can solve Relationship 1 for $p_1$ to get the selection probability for the first format. The probability determination server 264 can then use $p_1$ to determine the selection probability for the second format, i.e., $1-p_1$.

Continuing the previous example, the selection probability for the first format and the selection format for the second format would both be 0.5 (i.e., 50%). That is, Relationship 1 in this example would be 2.0*((0.5*1.2)+(0.5*1.4))=2.3. Thus, if the digital component is provided with extension 2 50% of the time and extension 3 50% of the time, the aggregate distribution parameter limit of 2.3 would not be exceeded although the distribution parameter limit of 2.3 would be exceeded each time the digital component is provided with extension 3.

In some implementations, the probability determination server 264 selects more than two formats, e.g., more than two extensions and determines selection probabilities for each of the selected formats such that the average combined selection requirement is equal to or within a threshold amount of the distribution parameter limit. For example, the probability determination server 264 can determine the selection probabilities such that can use Relationship 2 is satisfied.

$$\text{Base } SR*((p_1*(1+ASR_1))+((p_2)*(1+ASR_2))+\ldots+(p_n(1+ASR_n))=DPL \quad \text{Relationship 2:}$$

In Relationship 2, the parameters that match those of Relationship 1 are the same. In addition, $p_2$ is the selection probability for the second format, $p_n$ is the selection probability for the $n^{th}$ format, and $ASR_n$ is the additional selection requirement for the $n^{th}$ format.

In some implementations, the probability determination server 264 determines the selection probabilities using the lift for the extensions, or another measure of value for the extensions, in place of the combined selection requirement. For example, the probability determination server 264 can determine the selection probabilities using Relationship 3 below.

$$\text{Base } SR*((p_1*(1+L_1))+((1-*p_1)(1+L_2)))=DPL \qquad \text{Relationship 3:}$$

In Relationship 3, the parameters that match those of Relationship 1 are the same. In addition, $L_1$ is the lift for the first format and $L_2$ is the lift for the second format. Relationship 2 can be modified in a similar manner, e.g., by replacing the combined selection requirements with lifts to determine selection probabilities when more than two formats are used.

The extensions for which probabilities are determined and considered for a digital component can vary across the various times in which the digital component is selected for presentation. For example, if the base selection requirement is very low, two more expensive extensions can be considered. If the base selection is close to the distribution parameter limit for the digital component, two less expensive extensions may be considered.

The additional selection requirement for each extension, the distribution criteria for each digital component, the selection probabilities for the digital components, and/or other appropriate data for use in selecting digital components or extensions for digital components can be stored in the selection data storage unit 270. Each server 260, 262, and 264 can access the data and/or store selection data in the selection data storage unit 270.

Figure 3:
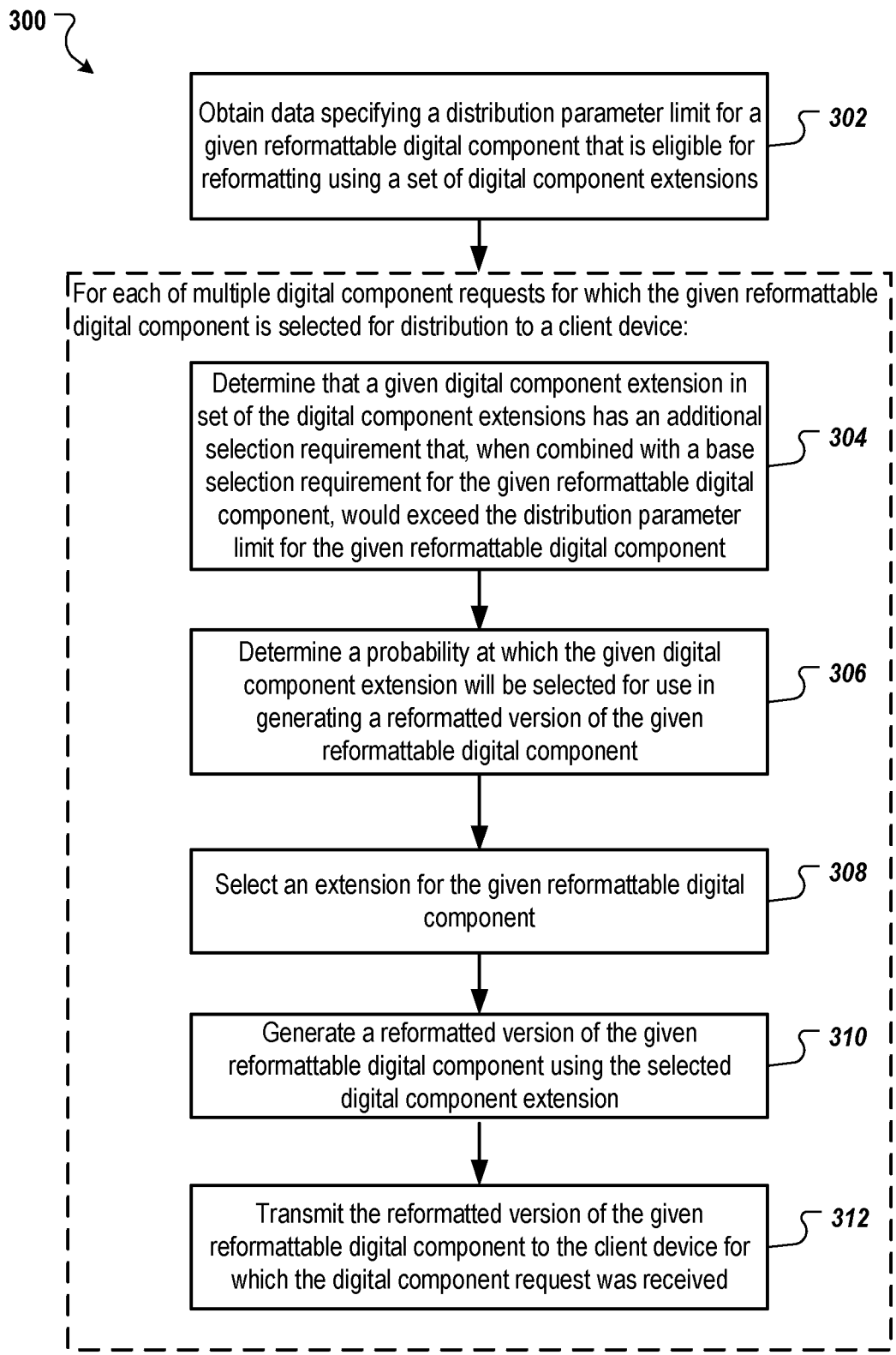
FIG. 3 is a flow diagram that illustrates an example process for generating and distributing reformatted versions of digital components.

FIG. 3 is a flow diagram that illustrates an example process 300 for generating and distributing reformatted versions of digital components. The process 300 can be implemented, for example, by the digital component distribution system 120 or 220 of FIG. 1 or 2. Operations of the process 300 can also be implemented as instructions stored on non-transitory computer readable media, and execution of the instructions by one or more data processing apparatus can cause the one or more data processing apparatus to perform the operations of the process 300.

Data specifying a distribution parameter limit for a given reformattable digital component is obtained (302). The reformattable digital component can be eligible for reformatting using a set of digital component extensions. As described above, the extension can include content or functionality that can be added to reformattable digital component to generate different formats of the digital component. The distribution parameter limit is an amount, e.g., in currency, that a selection requirement for providing the digital component is not to exceed. In some implementations, the distribution parameter limit can be a maximum bid.

For each of multiple digital component requests for which the given reformattable digital component is selected for distribution to a client device, a determination is made that a given digital component extension in the set of digital component extensions has an additional selection requirement that, when combined with a base selection requirement for the given digital component would exceed the distribution parameter limit for the given reformattable digital component (304). As described above, a base selection requirement can be determined for a digital component during a selection process in which the digital component is selected. In some implementations, the base selection requirement can be an amount required for the digital component to be distributed (e.g., an amount of a next highest selection requirement (e.g., second highest bid) of another available digital component. The base selection requirement is the amount that would be required to be submitted to the digital component distributor to provide the given digital component in a base format without any extension. Each extension can have an associated additional selection requirement that can be added to the base selection requirement if the digital component is reformatted to include the extension.

Normally, if the combined selection requirement (e.g., the base selection requirement plus the additional selection requirement) using an extension would exceed the distribution parameter limit, the reformattable digital component would not be provided using the extension. Using this process 300, if it is determined that the combined selection requirement for a given digital component extension would exceed the distribution parameter limit, the given digital component extension can used to reformat the digital component a specified probability even though doing so will cause the combined selection requirement to exceed the distribution parameter limit.

A selection probability at which the given digital component extension will be selected for use in generating a reformatted version of the given reformattable digital component is determined (306). For example, a respective selection probability can be determined for the given digital component extension and for one or more other digital component extensions. A selection probability can also be determined for a version of the reformattable digital component with no extension.

The selection probabilities can be determined such that an aggregate selection requirement for the reformattable digital component over time does not exceed an aggregate distribution parameter limit for the given reformattable digital component. The aggregate selection requirement can be the average selection requirement over time and the aggregate distribution parameter can be equal to the distribution parameter limit. For example, the distribution parameter limit may be 10. Over time, the average selection requirement for the reformattable digital component should be less than or equal to 10. The selection probabilities can be determined such that the average selection requirement is equal to 10 or within a threshold amount of 10. The selection probabilities for the extensions can be determined using Relationship 1, 2, or 3 above.

An extension (or no extension) is selected for the given reformattable digital component (308). The extension can be selected using the selection probabilities. For example, if the selection probability for a given extension is 50%, the given extension has a 50% chance of being selected for each digital component request for which the given reformattable digital component is selected.

A reformatted version of the given reformattable digital component is generated (310). The reformatted version can be generated by adding the content or functionality of the selected extension to the digital component. For example, if the selected extension is a rating extension, a rating for an entity associated with the given reformattable digital component can be added to the given reformattable digital component.

The reformatted version for the given reformattable digital component is transmitted to the client device for which the digital component request was received (312). For example, the reformatted version for the given reformattable digital component can be transmitted to the client device over a network. The reformatted version for the given reformattable digital component can then be presented by the client device.

Figure 4:
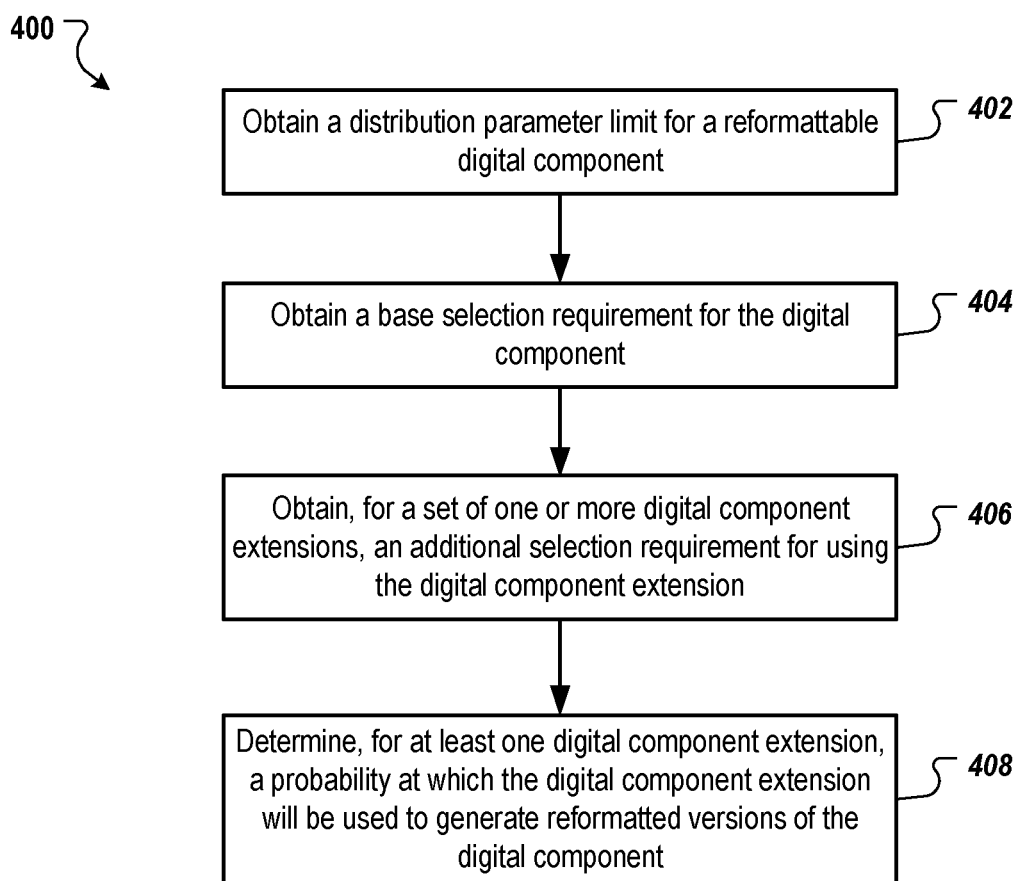
FIG. 4 is a flow diagram that illustrates an example process for determining probabilities for using digital components to generate reformatted versions of a digital component.

FIG. 4 is a flow diagram that illustrates an example process 400 for determining probabilities for using digital components to generate reformatted versions of a digital component. The process 400 can be implemented, for example, by the digital component distribution system 120 or 220 of FIG. 1 or 2. Operations of the process 400 can also be implemented as instructions stored on non-transitory computer readable media, and execution of the instructions be one or more data processing apparatus can cause the one or more data processing apparatus to perform the operations of the process 400.

A distribution parameter limit for a reformattable digital component is obtained (402). As described above, the distribution parameter limit is an amount that a selection requirement for providing the reformattable digital component is not to exceed.

A base selection requirement for the digital component is obtained (404). As described above, the base selection requirement for a digital component is a base amount that a publisher of the digital component is required to submit to a digital component distributor if a digital component distribution system of the distributor provides the base version of the digital component to a client device of a user.

An additional selection requirement is obtained for each digital component extension in a set of one or more digital component extensions (406). The additional selection requirement for an extension and a digital component is an amount that is combined with the base selection requirement to determine a combined selection requirement for the digital component when the digital component is provided with the extension. As described above, the additional selection requirement can be based on the lift provided by the extension.

A probability at which at least one extension will be used to generate reformatted versions of the digital component is determined (408). A selection probability can be determined for multiple extensions or, for an extension and a format of the digital component that does not have an extension. The formats for which a selection probability is determined can include at least one format (e.g., with an extension) for which the combined selection requirement exceeds the distribution parameter limit and at least one format for which the combined selection requirement does not exceed the distribution parameter limit. In this way, the selection probabilities can be determined such that the average selection requirement for providing the two or more formats of the digital component using the selection requirements is equal to or within a threshold amount of the distribution parameter limit.

The selection probability for each format can be determined using Relationships 1-3 above. For example, if two formats are selected, Relationship 1 or Relationship 3 can be used, depending on whether combined selection requirements are used or lifts provided by the extensions are used. If more than two formats are selected, Relationship 2 can be used to ensure that the selection probabilities result in an aggregate selection requirement that is equal to or within a threshold amount of the aggregate distribution parameter.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A system, comprising:
    a data processing apparatus; and
    a memory storage apparatus in data communication with the data processing apparatus, the memory storage apparatus storing instructions executable by the data processing apparatus and that upon such execution cause the data processing apparatus to perform operations comprising:
    receiving requests for digital components and provide digital components in response to the requests; and
        obtaining data specifying a distribution parameter limit for a given reformattable digital component that is eligible for reformatting using a set of digital component extensions, each digital component extension including additional content that, when selected, is used to generate a reformatted version of the given reformattable digital component;
        for each of multiple digital component requests for which the given reformattable digital component is selected for distribution to a client device in response to the digital component request:
            determining that a given digital component extension in the set of digital component extensions has an additional selection requirement that, when combined with a base selection requirement for the given reformattable digital component, would exceed the distribution parameter limit for the given reformattable digital component, the base selection requirement being an amount required to be submitted to a digital component distributor to provide a base version of the given reformattable digital component without an extension;
            determining, using a probabilistic technique and based at least on the distribution parameter limit and the base selection requirement, a probability at which the given digital component extension will be selected for use in generating a reformatted version of the given reformattable digital component such that an aggregate selection requirement for distributing the given reformattable digital component in response to a plurality of requests over time is within the distribution parameter limit;

selecting a digital component extension for the given reformattable digital component, wherein the given digital component extension for which a combination of the base selection requirement and the additional selection requirement exceeds the distribution parameter limit is selected for a portion of the digital component requests according to the determined probability;

generating a reformatted version of the given reformattable digital component using the selected digital component extension; and transmitting the reformatted version of the given reformattable digital component to the client device for which the digital component request was received.

2. The system of claim 1, wherein the operations comprise determining, using the probabilistic technique, a second probability at which a second digital component extension will be selected for use in generating a second reformatted version of the given reformattable digital component, wherein a combination of the base selection requirement and a second additional selection requirement for the second digital component extensions is less than the distribution parameter limit.

3. The system of claim 2, further comprising selecting the given digital component extension and the second digital component extension from the set of digital component extensions based on (i) the combination of the base selection requirement and the additional selection requirement and (ii) the combination of the base selection requirement and the second additional selection requirement.

4. The system of claim 3, wherein selecting the given digital component extension and the second digital component extension from the set of digital component extensions comprises:

determining that a first combined selection requirement that is based on the combination of the base selection requirement and the additional selection requirement is a lowest combined selection requirement for the set of digital component extensions that is higher than the distribution parameter limit and, in response, selecting the given digital component extension; and determining that a second combined selection requirement that is based on the combination of the base selection requirement and a second additional selection requirement is a highest combined selection requirement for the set of digital component extensions that is less than the distribution parameter limit and, in response, selecting the second digital component extension.

5. The system of claim 1, wherein the operations comprise determining, using the probabilistic technique, a second probability at which the given reformattable digital component will be provided without reformatting using a digital component extension.

6. The system of claim 1, wherein the operations comprise determining, for each or two or more second digital component extensions, a respective second probability at which the second digital component extension will be selected for use in generating a second reformatted version of the given reformattable digital component, wherein the probability at which the given digital component extension will be selected and each second probability are determined such that the aggregate selection requirement for distributing the given reformattable digital component using the given digital component extension and each of the second digital component extensions is within the distribution parameter limit.

7. The system of claim 1, wherein determining the probability at which the given digital component will be selected for use in generating the reformatted version of the given reformattable digital component comprises determining the probability based on an expected increase in user interactions with the given reformattable digital component by including the given digital component extension in the reformatted version of the given reformattable digital component.

8. The system of claim 1, wherein the base selection requirement for the given reformattable digital component is based on a combination of the distribution parameter limit and a performance of the given reformattable digital component.

9. A method performed by one or more data apparatus, the method comprising:

obtaining data specifying a distribution parameter limit for a given reformattable digital component that is eligible for reformatting using a set of digital component extensions, each digital component extension including additional content that, when selected, is used to generate a reformatted version of the given reformattable digital component;

for each of multiple digital component requests for which the given reformattable digital component is selected for distribution to a client device in response to the digital component request:

determining that a given digital component extension in the set of digital component extensions has an additional selection requirement that, when combined with a base selection requirement for the given reformattable digital component, would exceed the distribution parameter limit for the given reformattable digital component, the base selection requirement being an amount required to be submitted to a digital component distributor to provide a base version of the given reformattable digital component without an extension;

determining, using a probabilistic technique and based at least on the distribution parameter limit and the base selection requirement, a probability at which the given digital component extension will be selected for use in generating a reformatted version of the given reformattable digital component such that an aggregate selection requirement for distributing the given reformattable digital component in response to a plurality of requests over time is within the distribution parameter limit;

selecting a digital component extension for the given reformattable digital component, wherein the given digital component extension for which a combination of the base selection requirement and the additional selection requirement exceeds the distribution parameter limit is selected for a portion of the digital component requests according to the determined probability;

generating a reformatted version of the given reformattable digital component using the selected digital component extension; and transmitting the reformatted version of the given reformattable digital component to the client device for which the digital component request was received.

10. The method of claim 9, further comprising determining, using the probabilistic technique, a second probability at which a second digital component extension will be selected for use in generating a second reformatted version of the given reformattable digital component, wherein a combination of the base selection requirement and a second additional selection requirement for the second digital component extensions is less than the distribution parameter limit.

11. The method of claim 10, further comprising selecting the given digital component extension and the second digital component extension from the set of digital component extensions based on (i) the combination of the base selection requirement and the additional selection requirement and (ii) the combination of the base selection requirement and the second additional selection requirement.

12. The method of claim 11, wherein selecting the given digital component extension and the second digital component extension from the set of digital component extensions comprises:

determining that a first combined selection requirement that is based on the combination of the base selection requirement and the additional selection requirement is a lowest combined selection requirement for the set of digital component extensions that is higher than the distribution parameter limit and, in response, selecting the given digital component extension; and determining that a second combined selection requirement that is based on the combination of the base selection requirement and a second additional selection requirement is a highest combined selection requirement for the set of digital component extensions that is less than the distribution parameter limit and, in response, selecting the second digital component extension.

13. The method of claim 9, further comprising determining, using the probabilistic technique, a second probability at which the given reformattable digital component will be provided without reformatting using a digital component extension.

14. The method of claim 9, further comprising determining, for each or two or more second digital component extensions, a respective second probability at which the second digital component extension will be selected for use in generating a second reformatted version of the given reformattable digital component, wherein the probability at which the given digital component extension will be selected and each second probability are determined such that the aggregate selection requirement for distributing the given reformattable digital component using the given digital component extension and each of the second digital component extensions is within the distribution parameter limit.

15. The method of claim 9, wherein determining the probability at which the given digital component will be selected for use in generating the reformatted version of the given reformattable digital component comprises determining the probability based on an expected increase in user interactions with the given reformattable digital component by including the given digital component extension in the reformatted version of the given reformattable digital component.

16. The method of claim 9, wherein the base selection requirement for the given reformattable digital component is based on a combination of the distribution parameter limit and a performance of the given reformattable digital component.

17. A non-transitory computer storage medium encoded with a computer program, the program comprising instructions that when executed by one or more data processing apparatus cause the one or more data processing apparatus to perform operations comprising:

obtaining data specifying a distribution parameter limit for a given reformattable digital component that is eligible for reformatting using a set of digital component extensions, each digital component extension including additional content that, when selected, is used to generate a reformatted version of the given reformattable digital component;

for each of multiple digital component requests for which the given reformattable digital component is selected for distribution to a client device in response to the digital component request:

determining that a given digital component extension in the set of digital component extensions has an additional selection requirement that, when combined with a base selection requirement for the given reformattable digital component, would exceed the distribution parameter limit for the given reformattable digital component, the base selection requirement being an amount required to be submitted to a digital component distributor to provide a base version of the given reformattable digital component without an extension;

determining, using a probabilistic technique and based at least on the distribution parameter limit and the base selection requirement, a probability at which the given digital component extension will be selected for use in generating a reformatted version of the given reformattable digital component such that an aggregate selection requirement for distributing the given reformattable digital component in response to a plurality of requests over time is within the distribution parameter limit;

selecting a digital component extension for the given reformattable digital component, wherein the given digital component extension for which a combination of the base selection requirement and the additional selection requirement exceeds the distribution parameter limit is selected for a portion of the digital component requests according to the determined probability;

generating a reformatted version of the given reformattable digital component using the selected digital component extension; and transmitting the reformatted version of the given reformattable digital component to the client device for which the digital component request was received.

18. The non-transitory computer storage medium of claim 17, wherein the operations comprise determining, using the probabilistic technique, a second probability at which a second digital component extension will be selected for use in generating a second reformatted version of the given reformattable digital component, wherein a combination of the base selection requirement and a second additional selection requirement for the second digital component extensions is less than the distribution parameter limit.

19. The non-transitory computer storage medium of claim 18, wherein the operations comprise selecting the given digital component extension and the second digital component extension from the set of digital component extensions based on (i) the combination of the base selection requirement and the additional selection requirement and (ii) the combination of the base selection requirement and the second additional selection requirement.

20. The non-transitory computer storage medium of claim 19, wherein selecting the given digital component extension and the second digital component extension from the set of digital component extensions comprises:
   determining that a first combined selection requirement that is based on the combination of the base selection requirement and the additional selection requirement is a lowest combined selection requirement for the set of digital component extensions that is higher than the distribution parameter limit and, in response, selecting the given digital component extension; and
   determining that a second combined selection requirement that is based on the combination of the base selection requirement and a second additional selection requirement is a highest combined selection requirement for the set of digital component extensions that is less than the distribution parameter limit and, in response, selecting the second digital component extension.

* * * * *